(12) United States Patent
Worrall

(10) Patent No.: US 7,100,881 B2
(45) Date of Patent: Sep. 5, 2006

(54) MOUNT

(75) Inventor: Raymond Worrall, Wolverhampton (GB)

(73) Assignee: AVF Group Limited, (GB)

( * ) Notice: Subject to any disclaimer, the term of this patent is extended or adjusted under 35 U.S.C. 154(b) by 169 days.

(21) Appl. No.: 10/817,515

(22) Filed: Apr. 2, 2004

(65) Prior Publication Data

US 2004/0206870 A1    Oct. 21, 2004

(30) Foreign Application Priority Data

Apr. 17, 2003    (GB) .................................. 0308906.7

(51) Int. Cl.
  *E04G 3/00* (2006.01)
(52) U.S. Cl. ............................. 248/278.1; 248/288.31; 248/288.51; 248/296.1; 248/515; 248/516; 116/173; 403/115; 403/143
(58) Field of Classification Search ............ 248/278.1, 248/288.31, 288.51, 296.1, 122.1, 516, 515; 116/173; 403/115, 143
See application file for complete search history.

(56) References Cited

U.S. PATENT DOCUMENTS 2,739,780 A  *  3/1956  Richards ..................... 248/324
4,647,434 A  *  3/1987  Ayers et al. ................. 422/144
5,899,167 A  *  5/1999  Furman ....................... 116/173
6,328,270 B1 * 12/2001  Elberbaum .............. 248/288.31

FOREIGN PATENT DOCUMENTS

GB          577786          5/1946

* cited by examiner

Primary Examiner—Richard E. Chilcot, Jr.
Assistant Examiner—Todd M. Epps
(74) Attorney, Agent, or Firm—Cantor Colburn LLP

(57) ABSTRACT

A mounting assembly comprises a mounting element for attachment to a surface, a cap engaged with the mounting element for angular movement relative thereto and having a slot therein through which extends an arm of a support member, there being at one end of the arm a ball which is received in a socket defined between the cap and the mounting element. A coupling nut is engagable with the mounting element so that in a first, tightened state, the nut locks the cap in its selected angular orientation relative to the mounting element, thereby retaining the arm in its selected position in the slot and the support member in its selected rotational position relative to the cap. In its second, unscrewed state, the nut allows adjustment of the cap, arm and support member correspondingly to adjust the orientation of an object mounted by the mounting assembly.

24 Claims, 4 Drawing Sheets

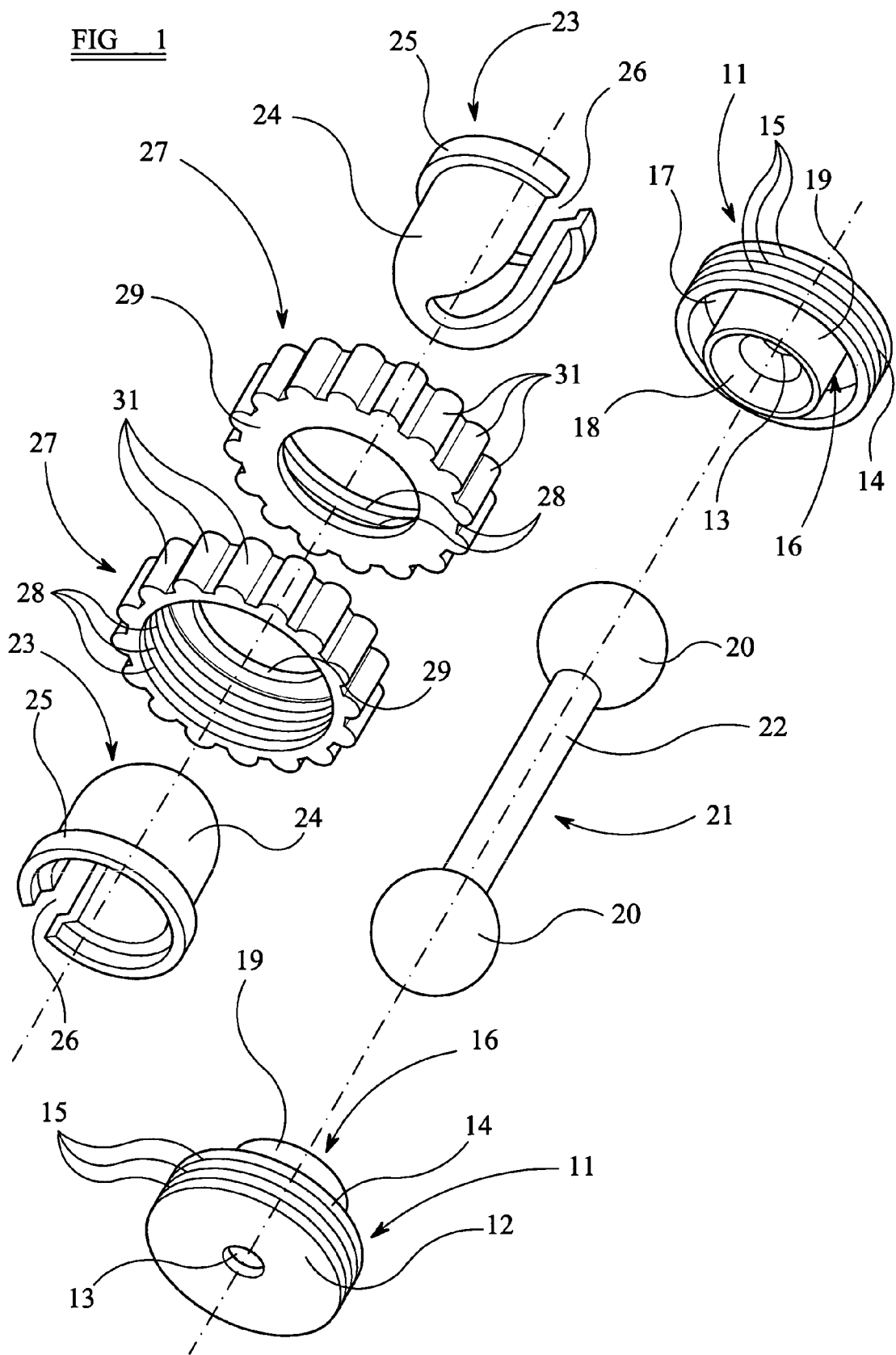

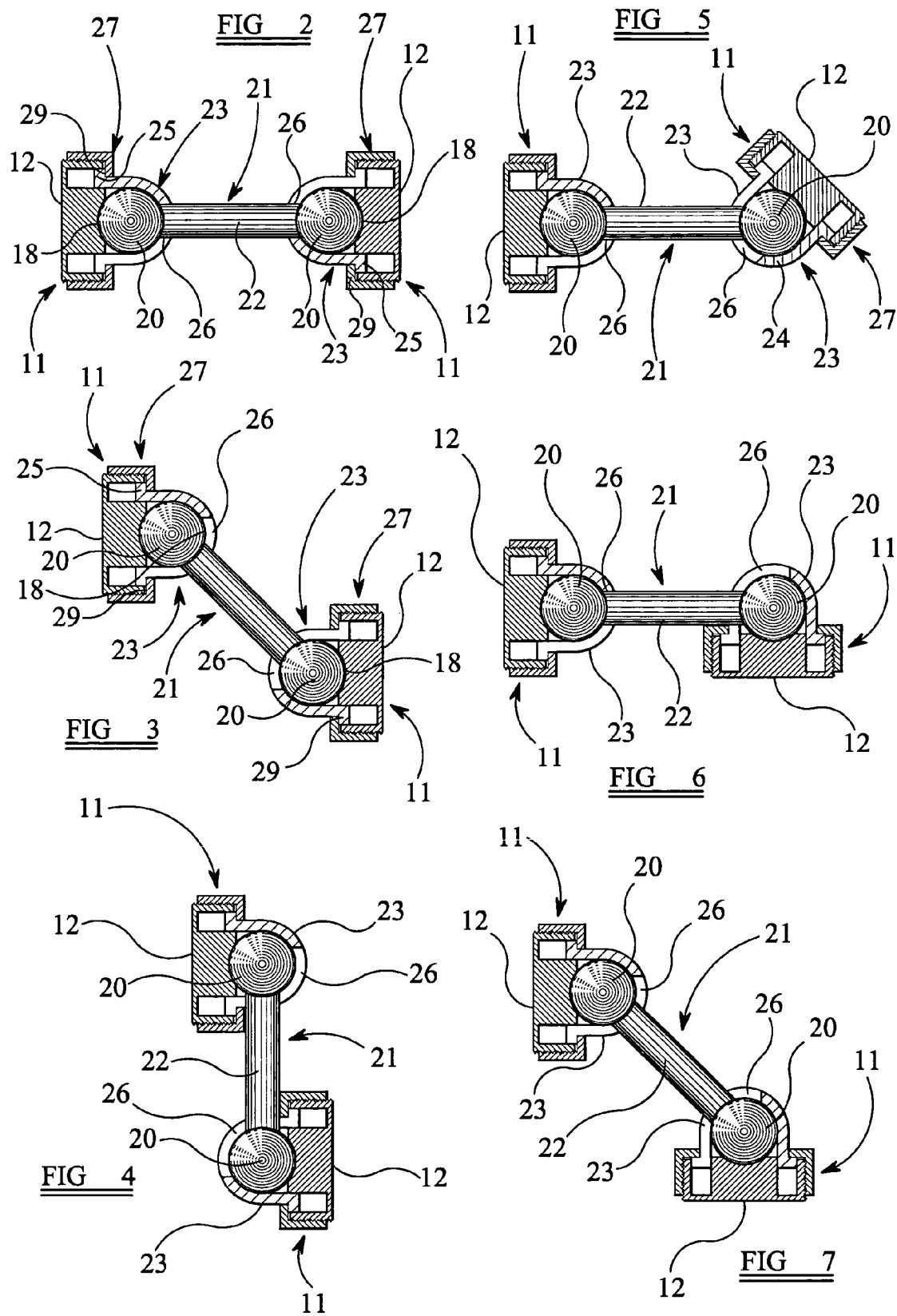

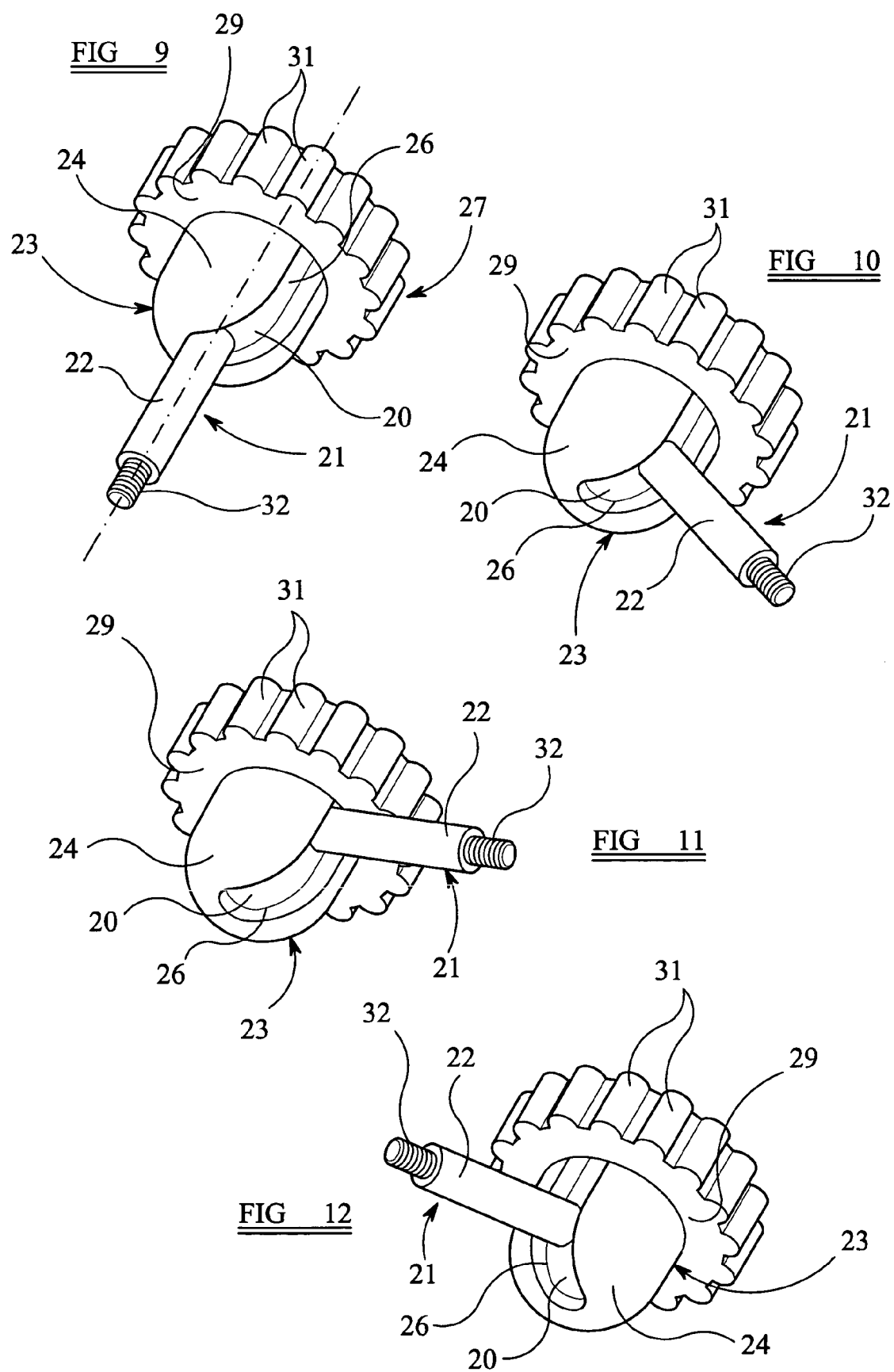

MOUNT

Figure 8:
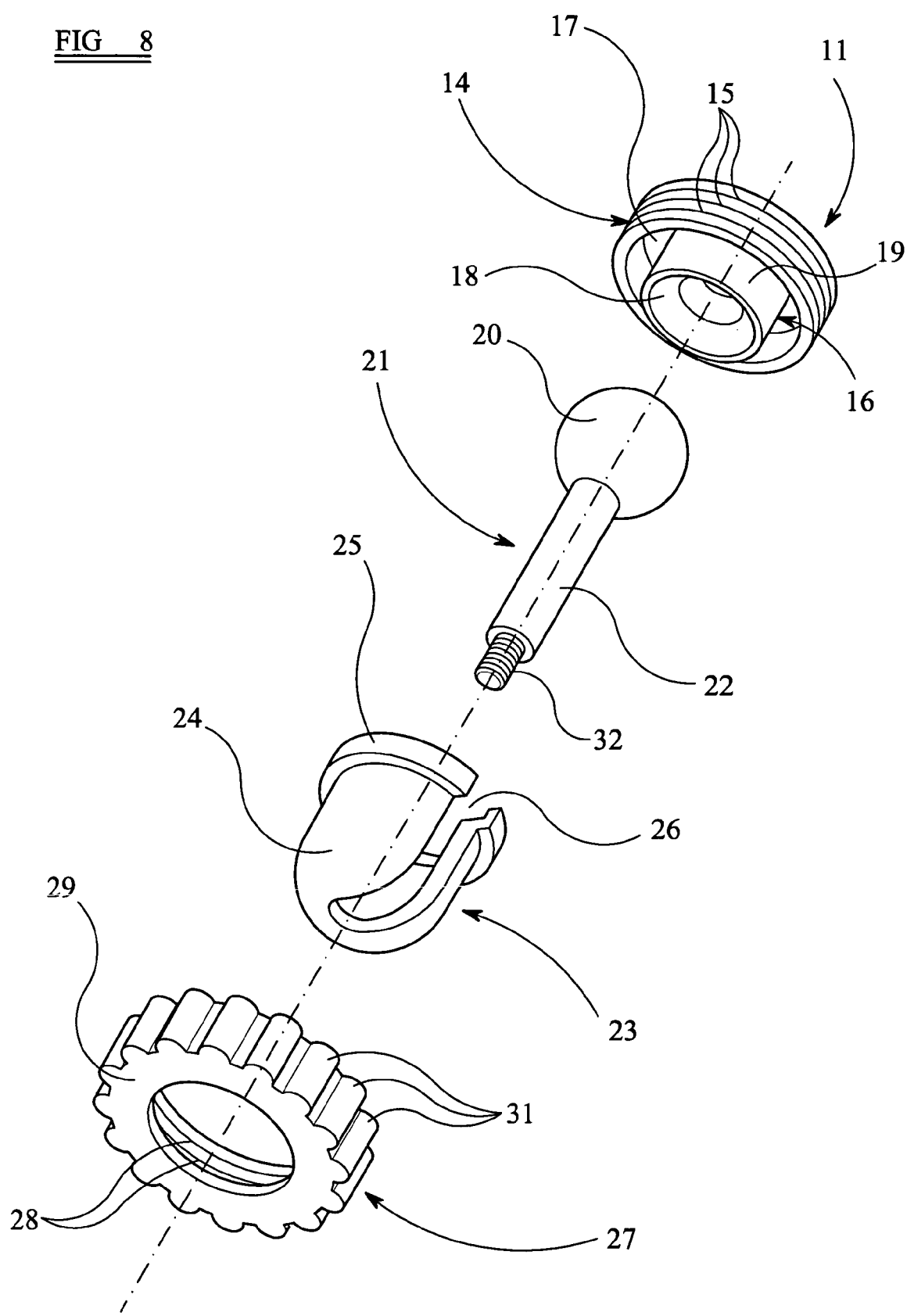

This invention relates to an adjustable mounting assembly particularly, but not exclusively, suitable for mounting an object such as a loudspeaker to a structure such as a wall or a ceiling.

Mounting devices in the form of conventional support brackets have been developed to mount objects such as loudspeakers to a wall. As it is often desirable to alter the position of the object once mounted e.g. vertical, lateral or rotational movement of the mounted object, adjustable mechanisms have been incorporated into such brackets. For example, a support arm of the bracket may be pivotally adjustable relative to a fixed wall plate thereof. However, pivotal adjustment is generally somewhat limited, and as a consequence, it is known for ball-and-socket joints to have been incorporated in such mounting devices. Whilst such mounting devices employing ball-and-socket joints increase the degree of adjustability, they are often of complex design, and may require a tool, such as a screwdriver, to adjust the orientation of the mounted object and possibly also initially to assemble the device.

An object of the present invention is to provide an improved mounting assembly.

According to a first aspect of the present invention, there is provided a mounting assembly, comprising a mounting element for attachment to a surface, a cap engaged with the mounting element, for angular movement relative thereto, and defining therewith a socket with which a part-spherical portion of a support member cooperates to form a ball and socket arrangement, the support member having an arm extending from said part-spherical portion through a slot in said cap and being angularly adjustable therealong, and coupling means being engageable with said mounting element in a first state so as to retain the cap in its selected angular orientation relative to the mounting element, to retain the support member in its selected orientation relative to the cap and the mounting element, and to retain the arm in its selected angular orientation in said slot, and wherein in a released, second state of the coupling means the cap can be adjustably moved angularly relative to the mounting element, the arm can be moved adjustably along said slot, and the support member can be adjustably moved rotationally relative to the cap and the mounting element, thereby to adjust the orientation of a mounted object.

Conveniently, the mounting assembly is die-cast or formed of plastics material.

Preferably, the support member has a ball at each longitudinal end of the arm, and said arrangement of mounting element, cap, and coupling means is present at both ends of the support member, such that two ball-and-socket arrangements are formed. Advantageously, one of said two mounting elements is adapted to be fixed, in use, to a surface such as a wall or ceiling, and the other mounting element is adapted to be fixed, in use, to an object to be mounted. Alternatively, the support member has a ball at only one longitudinal end of the arm, said assembly having the arrangement of mounting element, cap and coupling means present only at the end of the support member adjacent the ball, the other end of the arm preferably comprising a screw-threaded extension. Preferably, in such a single ball construction, the mounting element is adapted to be fixed, in use, to a surface such as a wall or ceiling, and the screw thread on the arm of the support member connects directly or indirectly to the object to be mounted. Preferably, the support member is constructed such that the ball and arm are integral and rigid.

Preferably, the mounting element has a base, having a flat outer mounting surface and desirably said mounting element has a central aperture through which fixing means such as a screw may pass. Advantageously, said mounting element has a circumferential wall which is externally threaded. Conveniently, said mounting element has a cylindrical spigot portion disposed concentrically within, and spaced from, said circumferential wall, and advantageously said spigot portion extends axially outwardly from said base of the mounting element, beyond said circumferential wall. Desirably, said spigot portion has an internal surface configured for complementary interfit with the, or a, ball of the support member. Preferably, an internal surface of the base between the circumferential wall and the spigot portion is annular.

Preferably, the cap is open ended and has a body portion which at its other, closed, end has a hemispherical internal profile, and advantageously at an open cylindrical end of the cap there is an annular collar which protrudes radially outwardly from the body portion of the cap. Preferably, the slot in said cap is radial and open-ended, extending inwardly through the collar from said open end, such that the collar is an incomplete annulus, to terminate beyond the uppermost centre point of said closed end of the body portion.

Desirably said cap fits over the spigot portion of the mounting element, to lie radially inward from the circumferential wall thereof, such that said collar is abutting said internal annular surface of the base of the mounting element.

Preferably, the coupling means is of an annular form and may comprise a nut. Advantageously said coupling means has internal threads, which cooperate with the external threads of the wall of the mounting element to engage the coupling means with the mounting element. Conveniently the external annular surface of the coupling means is provided with knurling or other gripping means, which facilitate tightening and loosening of the coupling means. Desirably, a rim extends radially inwardly from one end of said external annular surface of the coupling means.

Advantageously as the coupling means is tightened and thus screwed further onto the external threads of the mounting element, said rim of the coupling means abuts and thus exerts pressure onto the collar of the cap, causing the main body of the cap to exert pressure on the ball of the support member, so that said ball is held securely between said main body and the internal surface of the spigot, and the cap is held securely thereby to prevent its rotation.

According to a second aspect of the invention, there is provided a kit of parts for a mounting assembly of said first aspect, comprising a mounting element for attachment to a surface, a cap having a slot therein and being engageable with the mounting element for angular movement relative thereto, a support member having a part-spherical portion, the cap, when engaged with said mounting element, in use, defining therewith a socket with which said part-spherical portion of the support member can cooperate to form a ball and socket arrangement, the support member having an arm extending from said part-spherical portion, the arm being intended to extend, in use, through said slot in said cap and to be angularly adjustable therealong, and coupling means engageable with said mounting element in a first state so as to retain the cap in its selected angular orientation relative to the mounting element, to retain the support member in its selected orientation relative to the cap and the mounting element, and to retain the arm in its selected angular orientation in said slot, and wherein in a released, second state of the coupling means the cap can be adjustably moved angularly relative to the mounting element, the arm can be moved adjustably along said slot, and the support member can be adjustably moved rotationally relative to the cap and the mounting element, thereby to adjust the orientation of a mounted object.

The present invention will now be described, by way of example only, with reference to the accompanying drawings, in which:

FIG. 1 shows an exploded perspective view of a mounting assembly of the invention, having two ball-and-socket joints, FIGS. 2 to 7 respectively show schematic reduced scale representations of the assembled assembly of FIG. 1, depicting various possible adjusted orientations, FIG. 8 shows an exploded perspective view of another embodiment of a mounting assembly of the invention, having only one ball-and-socket joint, and FIGS. 9 to 12 respectively show schematic perspective views of the assembled assembly of FIG. 8, depicting various possible adjusted orientations.

Referring to the drawings, the assembly 10 as shown in FIG. 1 comprises a first mounting element 11 for fixing to a surface such as a wall or a ceiling, not illustrated, and an identical second mounting element 11 for fixing to a surface of the object to be mounted, for example a loudspeaker, also not illustrated. Referring to just one of the identical mounting elements 11, the mounting element 11 has a circular base with a flat external surface 12 for fixing to the surface i.e. the wall or ceiling, or the object to be mounted. Fixing means such as a screw, which is not illustrated, can be passed through a central aperture 13 in the base of the mounting element. It will be appreciated that fixing means need not necessarily pass through the centre of the base of the mounting element, and that instead, the mounting element may be attached to a further structure through which such fixing means pass. Whilst with a solid wall or ceiling, or some types of loudspeaker, the thread of a single screw can pass through aperture 13 into the wall or ceiling or loudspeaker, other types of loudspeaker use a keyhole fixing, with the shank of a headed, threaded bolt extending out from a keyhole opening in the rear of the loudspeaker through aperture 13 to engage with a nut received in the bottom of a spigot of the element 11, described below.

Extending normally from the base at the periphery thereof is a circumferential wall portion 14 having external threads 15. A cylindrical spigot portion 16 is disposed concentrically within the circumferential wall, and spaced centrally therefrom, said spigot portion 16 extending outwardly from the base, to protrude beyond the free end of the wall portion 14. Between the circumferential wall portion 14 and the spigot portion 16, lies a flat inner annular surface 17 of the base. Adjacent its outer end, the spigot portion 16 has an internal surface 18 profiled, in this embodiment, matchingly to receive a ball 20 of a support member 21, such that when assembled, the ball is partially received by, and can smoothly rotate within the spigot portion 16. The central aperture 13 is continued through, and opens at the internal surface 18 of, the spigot portion. Instead of surface 18 being spherical, it could be chamfered, i.e at 45°. With a loudspeaker having a keyhole fixing, the nut for the shank extending from the loudspeaker is fixed in an opening behind the profiled surface 18.

The support member 21 comprises an arm portion 22 in the form or a cylindrical bar, to which a ball 20 is rigidly attached at each longitudinal end thereof. The ball may be integral with the arm, or alternatively may be otherwise connected thereto, for example the ball may be screwed onto the arm. It will be appreciated that in addition to the embodiments illustrated and described herein, the ball may be in the form of an incomplete sphere (part-spherical), or of any other form suitable for at least a degree of smooth rotation in relation to the components with which it forms a ball-and-socket joint.

Each mounting element 11 is constructed to receive one of two individual caps 23. Each cap has a body portion 24 of closed hemispherical form, with a cylindrical form at its open end. It will be understood that, although it is important that the internal profile of at least part of the body portion is matchingly profiled to the ball 20, the external profile of the body portion need not be so profiled. The open end of each cap is stepped outwardly to form an annular collar 25, which protrudes radially outwardly from the cylindrical portion of the body portion 24 of the cap. Each cap has an open-ended slot 26, which extends radially from the open end of the cap, inwardly through the collar 25, such that the collar is an incomplete annulus, to beyond the uppermost centre point of said closed body portion 24 of the cap. However, it will be noted that the slot may be of a variety of lengths, and may even be closed-ended as will be described below.

During assembly of the mounting, the arm portion 22 of the support member 21 is inserted into the slot 26 of one cap 23, and manipulated so that one ball 20 is disposed within the body portion of the cap, with the arm portion passing through the slot. The profile of the body portion 24 of each cap is such that a ball 20 can rotate smoothly within the cap. This cap 23 and support member 21 arrangement is then positioned with respect to one of the mounting elements 11, by placing the cap over the spigot portion 16 of the mounting element, such that the cap lies radially inward of the circumferential side portion 14 of the mounting element 11, with the collar 25 of the cap abutting the flat internal surface 17 of the base of the mounting element. The ball 20 is thus sandwiched between the internal surface 18 of the spigot portion of the mounting element, and the main body portion 24 of the cap. This creates a first ball-and-socket joint.

As indicated above, the slot 26 need not be open-ended, and thus the collar 25 may be a complete annulus. If this were the case, it would be necessary for the ball 20 to be releasably connected to the arm 22, for example by said screw means described above, in order to allow the arm to pass through the slot during assembly, and its externally screw-threaded smaller end extension screwed into a complementarily threaded bore in the ball.

A coupling means in the form of a circular coupling nut 27 is then placed over the support member and positioned over the collar 25 of the cap. The coupling nut is of an annular form, and has internal threads 28 which cooperate with the external threads 15 of the mounting element 11. A rim 29 extends radially inwardly from the end of the annular surface of the nut that is distal to the mounting element and cap. The nut is screwed onto the mounting element, and a plurality of knurls 31 or other grip assisting means enables the nut to be gripped to facilitate nut tightening and loosening, although it will be appreciated that such knurls are not essential features of the invention. As the nut is tightened, the rim 29 pushes down on the cap collar 25 to tighten the hold on the ball 20 between the main body portion 24 of the cap and the internal surface 18 of the spigot portion of the mounting element. When the nut is fully tightened, rotational movement of the ball within the spigot and cap is prevented, and the arm portion 22 of the support member cannot be moved within the slot. In addition, angular movement of the cap relative to the mounting element is prevented. When the nut is loosened, rotation of the ball within the cap and spigot is permitted i.e. the arm 22 can be rotated about its axis, and the arm portion 22 of the support member can be moved along the slot, thus permitting angular movement of the support member relative to the mounting element. Furthermore, the cap 23 can be rotated within the mounting element 11, so that when the mounting element is fixed to a surface, the slot can be orientated as desired to permit angular movement of the support member 21 in the desired plane.

When one of the balls 20 of the support member 21 has been positioned within a cap 23 and connected to a mounting element 11 by a coupling nut 27, the assembly process is then repeated for the second ball 20 to create a second ball-and-socket joint assembly. It will be appreciated that with an integrated ball and arm, the second nut 27 must be placed over the support member 21 before placing the second ball within the second cap. In the embodiment illustrated, the second ball-and-socket joint is identical to the first as described above, and thus tightening and loosening of the second nut allows the movement of the ball within the socket thus created to be restricted or permitted as required, as with the first ball-and-socket joint.

In this particular double ball-and-socket joint embodiment as illustrated in FIGS. 1 to 7, it will be appreciated that one of the two balls 20 is received in the spigot portion 16 of the first mounting element, which is fixed to a surface such as a wall or ceiling, and the other ball 20 is received in the spigot portion of the second mounting element, which in turn is fixed to the object to be mounted.

Once the mount is assembled with mounting element 11 being fixed to a surface such as a wall or a ceiling, and the other mounting element 11 being fixed to the object to be mounted, each of the two coupling nuts 27 may be loosened or tightened as required, to allow each ball-and-socket joint to be orientated as desired. Thus a variety of configurations of the support member 21 in relation to both the first and second mounting elements may be achieved, and fixed in position as required simply by loosening and tightening the respective coupling nuts. No tools are required, as with some prior art adjustable mounts, and a simple assembly is provided. The mount of the invention can be sold assembled, or as a kit of parts for subsequent assembly.

In FIGS. 2 to 7, for ease of description, the mounting elements 11 to the left of each of the figures have been notionally designated those which would be fixed to a surface such as a wall, and the mounting elements 11 to the right of the figures have been notionally designated those which would be fixed to the object, such as a loudspeaker, to be mounted. In each of FIGS. 2 to 7, the mounting element 11 fixed to the wall is thus kept in a constant position, and the respective slots 26 of the two caps 23 are disposed in a direction perpendicular to the notional floor. In FIGS. 2 to 4, both the 'wall-mounting' and the 'loudspeaker-mounting' elements remain in an orientation such that the external flat surfaces of the mounting elements are parallel both to each other, and to the notional wall. This is achieved by movement of the arm portion 22 of the support member (and thus of the support member itself) within each slot of the respective caps. FIG. 2 shows the assembly with the support member 21 perpendicular to the external flat surfaces 12 of both mounting elements 11. FIG. 3 shows the assembly with the arm portion 22 moved along the slot i.e. in a downward direction towards the notional floor. In order to keep the second mounting element parallel to the first, the arm portion of the support member has moved along the slot of the cap in the second mounting element in an upward direction. Thus the mounted object such as the loudspeaker has been moved downwards, and has remained in the same orientation as in FIG. 2, with the arm of the support member being disposed at approximately a 45° angle to the plane of the notional wall. In FIG. 3, the loudspeaker has been moved further downwards, as the arm portion of the support member has been moved further to the outer radial edge of the slots in the caps, such that the arm portion is parallel to the notional wall.

FIGS. 5 to 7 demonstrate further possible arrangements of the mounting assembly. More specifically, FIG. 5 shows the arm portion 22 of the support member perpendicular to the notional wall as in FIG. 2, but with the second mounting element tilted upwardly, by movement of the arm along the slot away from the closed end of the slot. FIG. 6 shows the assembly, again with the arm portion of the support member perpendicular to the notional wall, but with the second cap rotated through 180° from the FIG. 5 position, such that the slot runs along the lower portion of the cap with relative movement of the arm along the slot to the open end thereof, so that the second mounting element is positioned parallel to the notional floor. FIG. 7 shows the assembly after the second mounting element has been moved downward from its position as shown in FIG. 6, still with the second mounting element parallel to the notional floor. To enable the position as shown in FIG. 7 to be achieved, the arm portion of the support member has travelled downwardly along the slot of the first cap, and upwardly along the slot of the second cap, to lie at approximately a 45° angle to the plane of the notional wall.

It will be appreciated from the description of the assembly that FIGS. 2 to 7 show only a selection of the configurations attainable by manipulation of the double ball-and-socket assembly, and that in reality, many more positions are possible, by adjustments which include lateral rotation of each of the balls within the two ball-and-socket joints with respect to the plane of the notional wall, rotation of the arm about its own axis, and rotation of each of the caps to alter the orientation of the respective slots therein.

In addition to a double ball-and-socket mount assembly, it is envisaged that a single ball-and-socket assembly could be employed. An example of this further embodiment is depicted in FIGS. 8 to 12. As can be seen best from FIG. 8, the assembly is substantially the same as that described in FIGS. 1 to 7, but instead of having two caps 23, balls 20 and coupling nuts 27, there is only one of each of these components. Instead of a second ball at one longitudinal end of the arm portion of the support member 21, there is an attachment means such as a screw thread 32, which can be employed to fix the mount assembly to the object to be mounted. If a screw thread is employed, the object to be mounted may conveniently be fitted with a complimentary nut fitting to receive the screw thread.

It will be understood that with the single ball-and-socket embodiment, less range of motion of the mount assembly can be achieved. FIGS. 9 to 12 show example possible configurations. For ease of description, the mounting element 11 in each of the FIGS. 9 to 12 has been notionally designated as being fixed to a surface such as a wall, and the screw thread 32 notionally designated as being fixed to the object to be mounted, such as a loudspeaker. More specifically, FIG. 9 shows the single ball-and-socket assembly with the support member 21 disposed centrally with respect to the mounting element, and perpendicular to the plane of the notional wall. It will be noted that the cap 23 is disposed such that the slot 26 runs in a substantially transverse direction. FIG. 10 shows the mount assembly of FIG. 9 after the arm 22 of the support member has been moved along the slot so that the arm is disposed laterally to the right at an approximately 45 degree angle to the plane of the notional wall. FIG. 11 shows the assembly after the arm has been moved further along the slot from its position as shown in FIG. 10, so that the arm lies to the right, substantially parallel to the plane of the notional wall. FIG. 12 shows the assembly after the cap 23 has been rotated in the mounting element 11 so that the slot lies in a substantially longitudinal direction, and the arm has been moved upwardly within the slot so that the arm is disposed upwardly at an approximately 45 degree angle to the plane of the, wall.

Again, it will be appreciated from the description of the variant single ball-and-socket assembly, that FIGS. 9 to 12 show only a selection of the configurations attainable by manipulation of the single ball-and-socket assembly, and that in reality, many more positions are possible, including lateral rotation of the ball within the ball-and-socket joint with respect to the plane of the notional wall, and rotation of the slot direction within the mounting elements. As with the double ball-and-socket embodiment, the single ball-and-socket arrangement can be sold assembled, or as a kit of parts.

The assembly as a whole, or any individual component thereof, is preferably a die-casting, such as a zinc die-casting, but alternatively, however, may be formed entirely or partly of any other suitable material, for example plastics material. The ball or balls 20 of the assembly may be rigidly fixed to the arm 22 of the support member 21, or alternatively may be screw-threadedly received thereon. The mounting elements can be adhesively secured to the wall or ceiling, or to the article being mounted. It will be appreciated that in addition to mounting an object such as a loudspeaker to a wall or ceiling, the present invention may be employed for a variety of applications where adjustability of the orientation of a mounted object is desirable.

The invention claimed is:

1. A mounting assembly comprising
a mounting element for attachment to a surface, a cap engaged with the mounting element for angular movement relative thereto, and defining therewith a socket with which a part-spherical portion of a support member co-operates to form a ball and socket arrangement, the support member having an arm extending from said part spherical portion through a slot in said cap and being angularly adjustable therealong, the cap being open ended having a body portion which at its other closed end has a hemispherical internal profile, said open end of the cap being cylindrical and having an annular collar which protrudes radially outwardly from the body portion of the cap, the slot being radial and open-ended, extending inwardly through the annular collar from said open end of cap, such that the collar is an incomplete annulus, to terminate beyond an uppermost centre point of said closed end of the body portion, and coupling means being engagable with said mounting element in a first state so as to retain the cap in its selected angular orientation relative to the mounting element, and to retain the arm in its selected angular orientation in said slot, and wherein in a released, second state of the coupling means, the cap can be adjustably moved angularly relative to the mounting element, the arm can be moved adjustably along said slot, and the support member can be moved rotationally relative to the cap and mounting element, thereby to adjust the orientation of a mounted object.

2. A mounting assembly as claimed in claim 1, wherein at each longitudinal end of its arm, the support member has a ball defining said part-spherical portion.

3. A mounting assembly as claimed in claim 2, wherein said arrangement of mounting element cap and coupling means is present at both ends of the support element, such that two ball and socket arrangements are formed.

4. A mounting assembly as claimed in claim 2, wherein one of said two mounting elements is adapted to be fixed, in use, to a surface and the other mounting element is adapted to be fixed, in use, to an object to be mounted.

5. A mounting assembly as claimed in claim 1, wherein at one longitudinal end only of its arm, the support member has a ball defining said part-spherical portion.

6. A mounting assembly as claimed in claim 5, wherein at the other longitudinal end of its arm, the support member has a screw threaded extension.

7. A mounting assembly as claimed in claim 6, wherein said arrangement of mounting element, cap and coupling means is present at said one longitudinal end only of the support member.

8. A mounting assembly as claimed in claim 6, wherein the mounting element is adapted to be fixed, in use, to a surface, and the screw threaded extension is adapted to connect directly or indirectly, in use, to an object to be mounted.

9. A mounting assembly as claimed in claim 5, wherein said ball is integral and rigid with said arm.

10. A mounting assembly as claimed in claim 2, wherein the mounting element has a base having a flat outer mounting surface.

11. A mounting assembly as claimed in claim 2, wherein the mounting element has a central aperture through which fixing means may pass.

12. A mounting assembly as claimed in claim 2, wherein the mounting element has a circumferential wall which is externally threaded.

13. A mounting assembly as claimed in claim 12, wherein the mounting element has a cylindrical spigot portion dispersed concentrically within, and spaced from, said circumferential wall.

14. A mounting assembly as claimed in claim 13, when dependent on claim 10, wherein the spigot portion extends axially outwardly from said base, beyond said circumferential wall.

15. A mounting assembly as claimed in claim 13, wherein the spigot portion has an internal surface configurated for complementary interfit with a ball of the support member.

16. A mounting assembly as claimed in claim 12, when dependent on claim 10, wherein an internal surface of the base between the circumferential wall and the spigot portion is annular.

17. A mounting assembly as claimed in claim 1, wherein the slot is radial and closed-ended.

18. A mounting assembly as claimed in claim 13, wherein the cap is adapted to fit over the spigot portion of the mounting element, to lie radially inwardly from the circumferential wall thereof, the cap having an outer annular collar at an open end thereof, which collar abuts an internal annular surface of the mounting element or a base of the mounting element.

19. A mounting assembly as claimed in claim 12, wherein the coupling means is of annular form.

20. A mounting assembly as claimed in claim 19, wherein the coupling means is a nut.

21. A mounting assembly as claimed in claim 19, wherein the coupling means has internal threads which co-operate with the external threads of the circumferential wall of the mounting element to engage the coupling means with the mounting element.

22. A mounting assembly as claimed in claim 19, wherein the coupling means has an external annular surface which is provided with gripping means facilitating tightening and loosening of the coupling means.

23. A mounting assembly as claimed in claim 19, wherein the coupling means has an external annular surface from one end of which a rim extends inwardly.

24. A kit of parts for a mounting assembly comprising a mounting element for attachment to a surface, a cap having a slot therein and being engagable with the mounting element for angular movement relative thereto, the can being open ended and having a body portion which at its other closed end has a hemispherical internal profile, said open end of the cap being cylindrical and having an annular collar which protrudes radially outwardly from the body portion of the cap, the slot being radial and open-ended, extending inwardly through the annular collar from said open end of the cap, such that the collar is an incomplete annulus, to terminate beyond an uppermost centre point of said closed end of the body portion, a support member having a part-spherical portion, the cap, when engaged with said mounting element, in use, defining therewith a socket with which said part-spherical portion of the support member can co-operate to form a ball and socket arrangement, the support member having an arm extending from said part-spherical portion, the arm being intended to extend, in use, through said slot in said cap and to be angularly adjustable therealong, and coupling means engagable with said mounting element in a first state so as to retain the cap in its selected angular orientation relative to the mounting element, to retain the support member in its selected orientation relative to the cap and the mounting element, and to retain the arm in its selected orientation in said slot, and wherein in a released, second state of the coupling means the cap can be adjustably moved angularly relative to the mounting element the arm can be moved adjustably along said slot, and the support member can be adjustably moved rotationally relative to the cap and the mounting element thereby to adjust the orientation of a mounted object.

* * * * *